United States Patent
Kim

[19]

[11] Patent Number: 5,821,707
[45] Date of Patent: Oct. 13, 1998

[54] INVERTER CONTROLLER FOR BRUSHLESS DIRECT CURRENT MOTOR

[75] Inventor: Hak Won Kim, Kyungki-Do, Rep. of Korea

[73] Assignee: LG Electronics Inc., Seoul, Rep. of Korea

[21] Appl. No.: 717,177

[22] Filed: Sep. 20, 1996

[30] Foreign Application Priority Data

Sep. 22, 1995 [KR] Rep. of Korea ................. 31339/1995

[51] Int. Cl.⁶ .................................................. H02P 6/08
[52] U.S. Cl. .......................................... 318/254; 318/722
[58] Field of Search ................................... 318/138, 254, 318/439, 700, 711, 715, 720, 721, 722, 724

[56] References Cited

U.S. PATENT DOCUMENTS

| | | | |
|---|---|---|---|
| 4,686,437 | 8/1987 | Langley et al. | 318/254 |
| 4,760,316 | 7/1988 | Hedlund | 318/254 |
| 5,142,208 | 8/1992 | Curran et al. | 318/254 |
| 5,221,881 | 6/1993 | Cameron | 318/254 |
| 5,300,866 | 4/1994 | Yasohara et al. | 318/254 |
| 5,319,291 | 6/1994 | Ramirez | 318/254 |
| 5,327,064 | 7/1994 | Arakawa et al. | 318/801 |
| 5,350,988 | 9/1994 | Le | 318/618 |

*Primary Examiner*—Bentsu Ro
*Attorney, Agent, or Firm*—Ostrolenk, Faber, Gerb & Soffen, LLP

[57] ABSTRACT

In an inverter controller for a brushless DC motor, when the upper and lower pole power switching devices are sequentially operated, a commutating signal is applied so that a commutated power switching device is always turned on, and a pulse width modulated commutating signal is applied to the non-commutated power switching. device, and thereby a driving efficiency of the brushless DC motor can be effectively enhanced by reducing a delay time of a free-wheeling current at the turn off section of the pulse width modulated commutating signal and further, a thermal balance of the power switching devices can be realized by the uniform PWM control of the power switching devices connected to the upper and lower poles to gain an effect of uniformly distributing a thermal stress applied to a specific power switching device.

6 Claims, 7 Drawing Sheets

| SECTION | COMMUTATING SIGNAL | | | | | |
|---|---|---|---|---|---|---|
| | CS1 | CS4 | CS2 | CS5 | CS3 | CS6 |
| 1 | 1 | 0 | 0 | 1 | 0 | 0 |
| 2 | 1 | 0 | 0 | 0 | 0 | 1 |
| 3 | 0 | 0 | 1 | 0 | 0 | 1 |
| 4 | 0 | 1 | 1 | 0 | 0 | 0 |
| 5 | 0 | 1 | 0 | 0 | 1 | 0 |
| 6 | 0 | 0 | 0 | 1 | 1 | 0 |

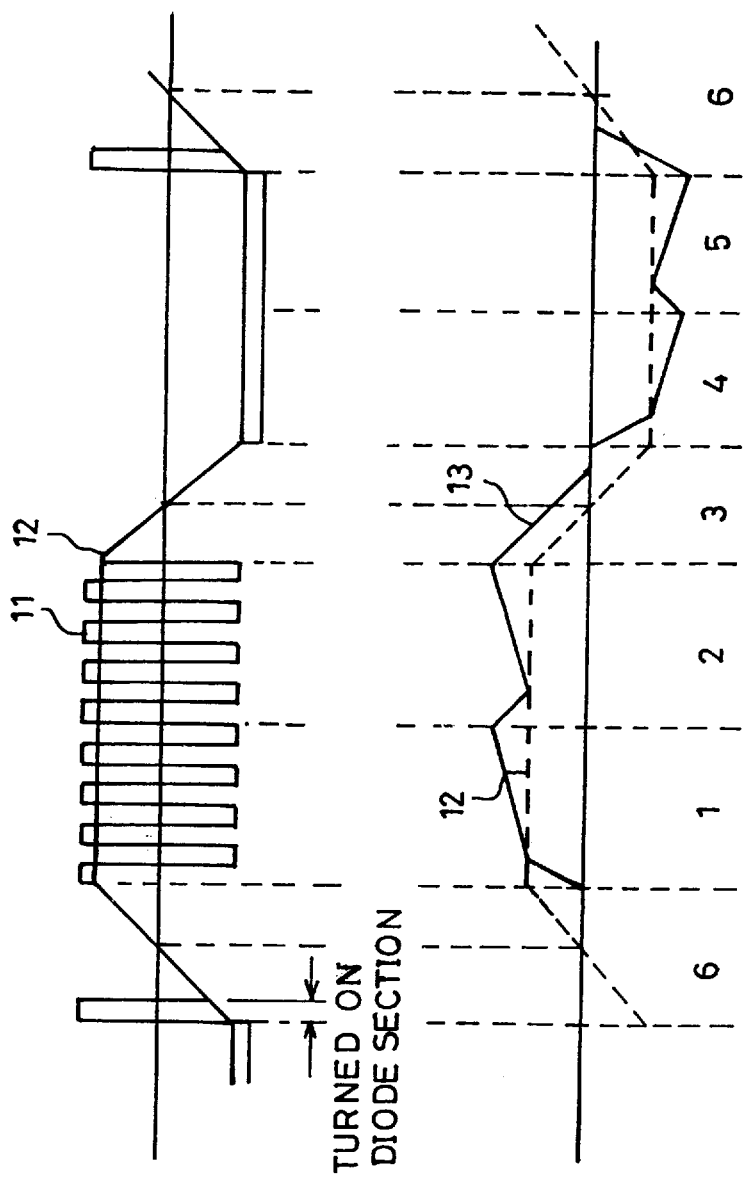

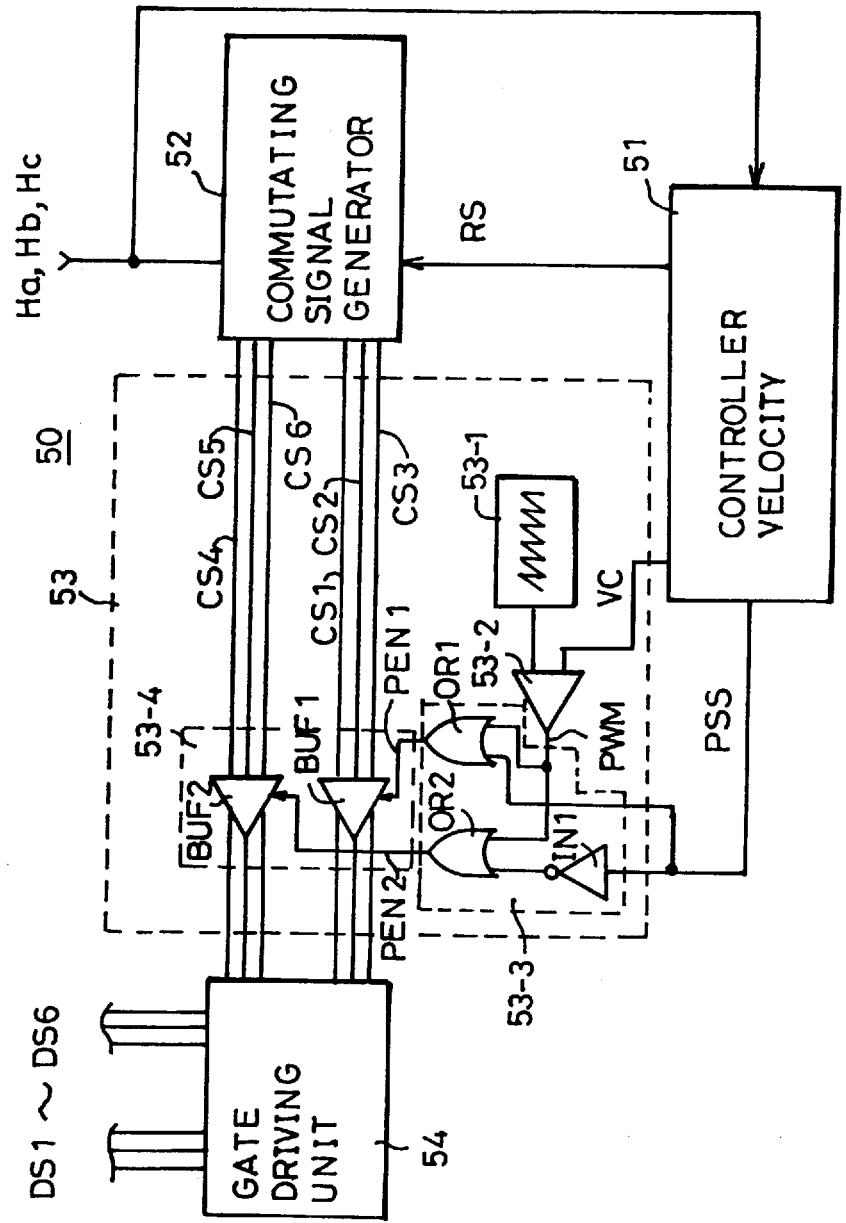

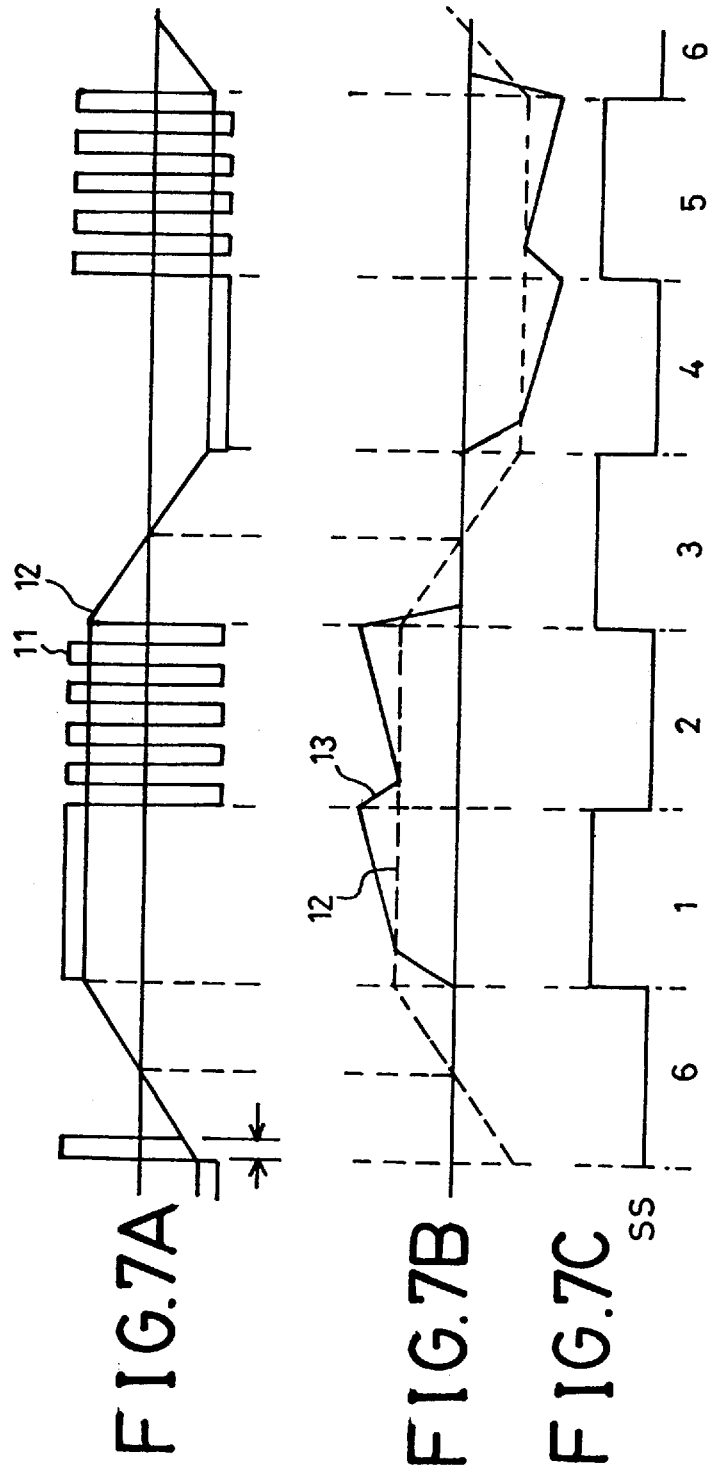

INVERTER CONTROLLER FOR BRUSHLESS DIRECT CURRENT MOTOR

BACKGROUND OF THE INVENTION

1. Field of the Invention

The present invention relates to an inverter controller for a brushless direct current(DC) motor, and more particularly, to an improved inverter controller for a brushless DC current motor which is capable of minimizing a current delay occurring when the brushless DC motor is commutated and of uniformly controlling a power switching device of the inverter by a PWM(pulse width modulation).

2. Description of the Prior Art

As shown in FIG. 1, a conventional brushless DC motor controller includes a rectifier 10 for rectifying and smoothing an alternating current(AC) through a diode bridge (BD) and a smoothing condenser(C), and an inverter 20 for receiving the rectified DC from the rectifier 10 and outputting a three-phase voltage(Va,Vb,Vc) in accordance with driving signals(DS1–DS6). A brushless DC motor 30 is operated by the three-phase voltage outputted from the inverter 20. An inverter controller 40 calculates the velocity of the brushless DC motor 30 in accordance with position detecting signals(Ha,Hb,Hc) outputted from the DC motor 30, compares the calculated value with programmed velocity command signals and outputs pulse width modulated driving signals(DS1–DS6) to the inverter 20.

The brushless DC motor 30 includes a stator(not illustrated) for receiving the three-phase voltage(Va,Vb,Vc) outputted from the inverter 20 and generating a rotary magnetic field, a rotor(not illustrated) rotated by the rotary magnetic field of the stator, and a position sensor 30-1 for detecting a rotating position of the rotor relative to the stator.

Here, the position sensor 30-1 comprises three Hall effect sensors disposed 120° apart on a concentric circle.

The inverter controller 40 includes a velocity controller 41 for calculating a velocity value from the position detecting signals(Ha,Hb,Hc) outputted from the position sensor 30-1, comparing the calculated value with a programmed velocity command signal and outputting a direction command signal(RS) and a velocity control signal, a commutating signal generator 42 for converting the order and phase of the position detecting signal in accordance with the direction command signal (RS) from the velocity controller 41 and generating commutating signals(CS1–CS6), a PWM processor 43 for processing the commutating signals (CS1–CS6) outputted from the commutating signal generator 42 with a pulse width modulation(PWM), and a gate driving unit 44 for converting the level of the commutating signals processed with PWM in the PWM processor 40.

The PWM processor 43 includes a sawtooth generator 43-1 for generating a reference signal for the PWM, a comparator 43-2 for comparing the output signal from the sawtooth generator 43-1 with the velocity control signal from the velocity controller 42 and outputting the PWM signal, and a three-phase buffer 43-3 for controlling with the PWM three commutating signals among the commutating signals(CS1–CS6) outputted from the commutating signal generator 42 in accordance with the PWM signal from the comparator 43-2.

As shown in FIG. 2, the inverter 20 includes power switching devices 21–26 turned on in accordance with the driving signals DS1–DS6 outputted from the inverter controller 40 and free wheeling diodes(D1–D6) connected in reverse parallel therewith. The power switching devices 21–23 are connected to an upper pole of the smoothing condenser (C), while the power switching devices 24–26 are connected to a lower pole of the smoothing condenser (C), and intermediate electric potential points therebetween are connected to the brushless DC motor 30.

Each phase(A,B,C) of the brushless DC motor 30 may be modeled by inductances (La,Lb,Lc), resistances (Ra,Rb,Rc) and voltage sources (EMFa,EMFb,EMFc). Here, the resistances (Ra,Rb,Rc) represents a wire wound resistance of the stator, each inductance (La,Lb,Lc) represents an inductance of a magnetic circuit including the winding wire of the stator and a stator slot, and each voltage source (EMFa,EMFb, EMFc) represents a backward electromotive force induced to the stator when the rotor rotates in accordance with a permanent magnet attached to the rotor.

The operation of the conventional brushless DC motor controller will now be described in detail, with reference to the accompanying drawings.

First, AC power inputted to the rectifier is rectified in the diode bridge(BD), smoothed by the smoothing condenser (C) and then inputted to the inverter 20. The power switching devices 21–26 are turned on in accordance with the six driving signals(DS1–DS6) outputted from the inverter controller 40 to output three-phase voltages(Va,Vb,Vc).

Then, the stator of the brushless DC motor receives the three-phase voltages(Va,Vb,Vc) outputted from the inverter 20 to generate a rotary magnetic field, whereby the rotor is rotated in accordance with the rotary magnetic field, and thereby the brushless DC motor 30 is operated.

FIG. 4 shows the waveforms of the three-phase(A,B,C) voltages(Va,Vb,Vc) and the back electromotive forces (EMFa,EMFb,EMFc) applied to the stator of the brushless DC motor 30, and the back electromotive forces (EMFa, EMFb,EMFc) are converted from a positive value into a negative value, or from a negative value into a positive value in the sections where the three-phase voltages(Va,Vb,Vc) are not applied.

When the brushless DC motor 30 is operated as described above, the position sensor 30-1 detects a rotating position of the rotor relative to the stator to output the position detecting signals(Ha,Hb,Hc), calculates the velocity of the brushless DC motor 30 from the position detecting signals(Ha,Hb,Hc), and compares the calculated value with the programmed velocity command signal to output a direction command signal(RS) and a voltage control signal(VC).

The commutating signal generator 42 converts the order and phase of the position detecting signals(Ha,Hb,Hc) in accordance with the direction command signal(RS) and generates the commutating signals(CS1–CS6), as shown in FIG. 3.

Here, the sawtooth generator 43-1 in the PWM processor outputs a sawtooth signal, and the comparator 43-2 compares the velocity control signal outputted from the velocity controller 41 with the sawtooth signal outputted from the sawtooth generator 43-1 to output a pulse-shaped PWM signal to the three-phase buffer 43-3.

Next, the three-phase buffer 43-3 modulates the commutating signals(CS4–CS6) inputted from the commutating signal generator 42 in accordance with the PWM signal. When the PWM signal is low level, the three-phase buffer 43-3 outputs "0" irrespective of the commutating signals (CS4–CS6), and when the PWM signal is high level, the three-phase buffer 43-3 outputs the commutating signals (CS4–CS6) with which the PWM signal is loaded.

Here, the three-phase buffer 43-3 carries out the pulse width modulation to simultaneously control the power switching devices 21–23 connected to the upper pole of the smoothing condenser(C) or the power switching devices 24–26 connected to the lower pole of the smoothing condenser(C).

First, the case where the pulse width modulation is carried out on the power switching devices 21–23 connected to the upper pole of the smoothing condenser(C) will be described.

The A phase will be taken for example to explain a commutating mechanism applied to the brushless DC motor 30 when the inverter 20 is operated in the sequence shown in FIG. 3.

FIG. 5A shows the waveform of a pulse width modulated voltage(va) 11 and the back electromotive force 12, and FIG. 5B shows the waveform of the back electromotive force 12 and current(Ia) 13 on the A phase.

A high level of the commutating signal (CS5) outputted from the commutating signal generator 42 in a section one is outputted as the driving signal(DS5) through the gate driving unit 44 to turn on lower pole power switching device 25. The high level commutating signal(CS1) undergoes PWM in the three-phase buffer 43-3 in accordance with the PWM signal outputted from the comparator 43-2 and is outputted as the PWM driving signal(DS1) through the gate driving unit 44 to turn on/off the upper pole of the power switching device 21 connected to the A phase. As a result, the current(Ia) on the A phase at the section one is increased, and the slope of the current(dIa/dt) is determined by the duty ratio of the PWM signal as follows:

$$Vab = 2 \times Ia \times Ra + 2 \times La \frac{dIa}{dt} + EMFab \qquad (1)$$

$$Vab = Vdc \times \text{Duty ratio}$$

$$\text{Duty ratio} = \frac{t_{on}}{t_{on} + t_{off}} = \frac{\text{turn on section}}{\text{one section of } PWM \text{ signal}}$$

$$\frac{dIa}{dt} = \frac{Vab - EMFab - 2 \times Ia \times Ra}{2 \times La}$$

Here, Vab is the entire voltage on the A and B phases in the inverter controller 40, and Vdc is the voltage between the both poles of the inverter 20.

Therefore, when the applied voltage(Va) is larger than the back electromotive force(EMFa) in the equation(1), the slope of the current will be positive.

Next, at a section two, when upper pole power switching device 21 connected to the A phase is controlled in accordance with the pulse width modulated driving signal(DS1) outputted from the gate driving unit 44 and the lower pole power switching device 26 connected to the C phase is turned on, the slope of the current(dIa/dt) is obtained by replacing b with c in the (1).

At a section three, the current (Ia) on the A phase is reduced when the upper pole power switching device 21 is turned off while the lower pole power switching device 26 is turned on and the upper pole power switching device 22 connected to the B phase is controlled by the pulse width modulated driving signal(DS2) outputted from the gate driving unit 44.

That is, when the upper pole power switching device 21 is turned off, the current(Ia) on the A phase maintained by the inductance(La) is free-wheeled through the lower pole diode(D4) connected in reverse parallel after passing through the resistance(Ra), the intermediate electric potential point(Vn), the resistance(Rc), the inductance(Lc), and the lower pole switching device 26.

$$0 = 2 \times Ia \times Ra + 2 \times La \frac{dIa}{dt} + EMFab \qquad (2)$$

$$\frac{dIa}{dt} = \frac{-EMFab - 2 \times Ia \times Ra}{2 \times La}$$

As shown in the equation (2), the negative slope of the current(dIa/dt) is proportional to the parameters (Ra,La) of the brushless DC motor 30, the current (Ia) and the back electromotive force(EMF) flowing in the brushless DC motor 30.

Here, the electromotive force(EMF) is proportional to the rotating velocity of the brushless DC motor 30, and when the rotating velocity is constant, the free-wheeling section of the current (Ia) is lengthened in proportion to the size of an initial current, that is, a load current.

At a section four, if Vab is replaced with Vba in the equation (1), the same equation as for the section one results and the current is obtained as the negative value.

$$-\frac{dIa}{dt} = \frac{Vab - EMFab - 2 \times Ia \times Ra}{2 \times La} \qquad (3)$$

At a section 5, the slope of the current (dIa/dt) can be obtained by replacing b with c in the equation (3).

However, the current (Ia) is free-wheeled through the upper pole diode(DI) connected in parallel and the slope of the current(dIa/dt) is sharply reduced when the section 5 transitions to a section 6, that is, when the upper pole switching device 23 connected to the C phase is controlled by the pulse width modulated driving signal(DS3) outputted from the gate driving unit 44, the lower pole power switching device 24 connected to the A phase is turned off, and the lower pole power switching device 25 connected to the B phase is turned on.

However, the conventional brushless DC motor controller, the slope of the current when the power switching device connected to the upper pole of the smoothing condenser is turned on, as in the section three, is different from that of the current when the power switching device connected to the lower pole of the smoothing condenser is turned on, as in the section six, which results in an imbalance on the motor torque.

As in the section three, when the power switching device connected to the upper pole is turned on, the free-wheeling current is disadvantageously delayed for a long time, resulting in the reduced driving efficiency of the brushless DC motor.

Further, the vibration of the motor and system is increased due to the imbalance of the brushless DC motor caused by the imbalance of the current slope.

Also, since the PWM controlling is carried out only on the power switching device connected to the upper pole or lower pole, a thermal stress applied to a specific switching device is disadvantageously increased.

SUMMARY OF THE INVENTION

Accordingly, it is an object of the present invention to provide an improved inverter controller for a brushless DC motor which is capable of uniformly distributing a thermal stress applied to a specific power switching device by achieving a thermal balance of a power switching device according to a uniform PWM control of the power switching device connected to the upper or lower pole.

It is another object of the present invention to provide an improved inverter controller for a brushless DC motor which is capable of reducing a delay time of a current and thereby maximizing an efficiency of a motor by applying a commutating signal to a commutated power switching device so that it is always turned on, and a pulse width modulated commutating signal to a non-commutated power switching device to sharply reduce a current in the turned-off section of the pulse width modulated commutating signal.

To achieve the above object, there is provided an improved inverter controller for a brushless DC motor which includes a velocity controller for calculating a velocity of the motor from a position detecting signals detected by a position sensor of the motor, comparing the calculated value with a programmed velocity command signal to output a direction command signal and a velocity control signal, and outputting a pulse width modulation(PWM) switching signal for selectively controlling by a PWM power switching devices connected to lower and upper poles of a smoothing condenser, a commutating signal generator for converting an order and phase of the position detecting signals in accordance with the direction command signal from the velocity controller and generating a commutating signal, a PWM processor for performing a pulse width modulation(PWM) of the commutating signal outputted from the commutating signal generator, and a gate driving unit for converting a level of the pulse width modulated commutating signal in the PWM processor and outputting a driving signal.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5A and 5B are waveform diagrams of a pulse width modulated voltage, a back electromotive force and a current on the A phase according to the conventional art;

FIG. 6 is a schematic block diagram of a inverter controller for a brushless DC motor according to the present invention;

FIGS. 7A through 7C are waveform diagrams of a pulse width modulated voltage, a back electromotive force and a current on the A phase according to the present invention.

DETAILED DESCRIPTION OF THE PREFERRED EMBODIMENTS

Figure 1:
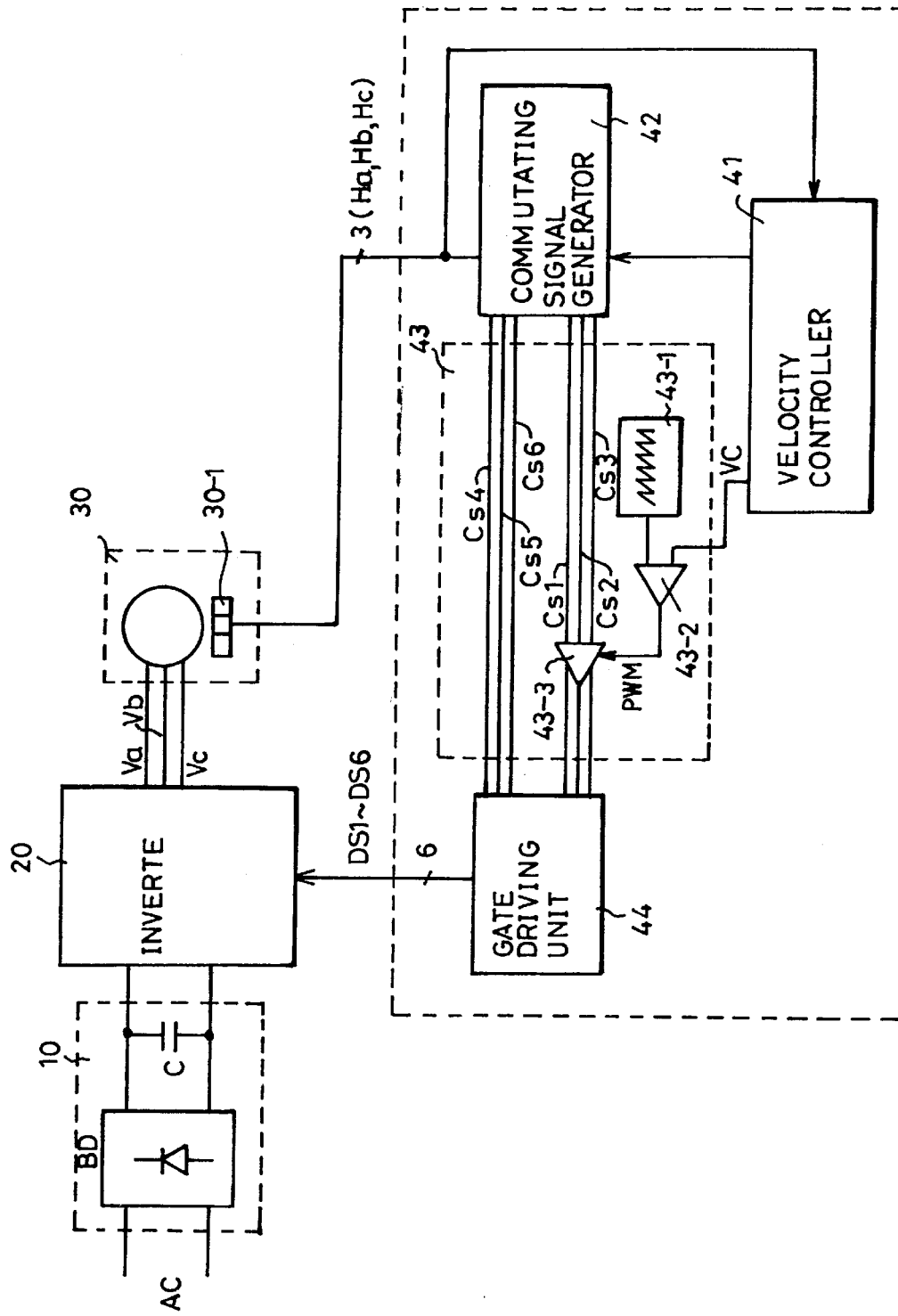
FIG. 1 is a schematic block diagram of an inverter controller for a brushless DC motor according to the conventional art.

FIG. 6 is a schematic block diagram of a inverter controller 50 for a brushless DC motor according to the present invention. In comparison with the conventional brushless DC motor controller shown in FIG. 1, the inverter controller 43 is differently composed.

An inverter controller 50 for a brushless DC motor includes a velocity controller 51 for calculating the velocity of the motor from position detecting signals(Ha,Hb,Hc) detected by a position sensor of the motor, comparing the calculated value with a programmed velocity command signal to output a direction command signal (RS) and a velocity control signal(VC), and then outputting a PWM switching signal(PSS) for selectively controlling by a PWM a power switching device connected to lower and upper poles, a commutating signal generator 52 for converting the order and phase of the position detecting signals(Ha,Hb,Hc) in accordance with the direction command signal(RS) from the velocity controller 51 and genetrating commutating signals (CS1–CS6), a PWM processor 53 for performing a pulse width modulation(PWM) of the commutating signals (CS1–CS6) outputted from the commutating signal generator 52, and a gate driving unit 54 for converting a level of the pulse width modulated commutating signal in the PWM processor and outputting a driving signal(DS).

The PWM processor 53 includes a sawtooth generator 53-1 for generating a reference signal for the PWM, a comparator 53-2 for comparing an output signal from the sawtooth generator 53-1 with the velocity control signal from the velocity controller 41 and outputting the PWM signal, a logical operator 53-3 for logically operating the PWM signal outputted from the comparator 53-2 and PWM switching signal (PSS) outputted from the velocity controller 51 to output PWM enable signals(PEN1,PEN2), and a buffer unit 53-4 for performing a PWM on the commutating signal outputted from the commutating signal generator 52 in accordance with the PWM enable signals (PEN1,PEN2) outputted from the logical operator 53-3.

The logic operator 53-3 includes an inverter (IN1) for inverting the PWM switching signal(PSS) outputted from the velocity controller 51, an OR gate (OR1) for ORing the PWM signal outputted from the comparator 53-2 and the PWM switching signal (PSS) outputted from the velocity controller 51 to output the PWM enable signal(PEN1), and an OR gate(OR2) for ORing the PWM signal outputted from the comparator 53-2 and an output from the inverter(IN1) to output the PWM enable signal(PEN2).

The buffer unit 53-4 includes a three-phase buffer(BUF1) for outputting commutating signals(CS1–CS3) for controlling a power switching device connected to an upper pole of the smoothing condenser (C) in accordance with the PWM enable signal (PEN1) outputted from the logical operator 53-3 to output a pulse width modulated commutating signal, and a three-phase buffer(BUF2) for outputting commutating signals(CS4–CS6) for controlling the power switching device connected to a lower pole of the smoothing condenser (C) in accordance with the PWM enable signal (PEN1) outputted from the logical operator 53-3 to output a pulse width modulated commutating signal.

The operation of the inverter controller for a brushless DC motor according to the present invention will now be described with reference to the accompanying drawings.

First, when the brushless DC motor 30 is operated in accordance with the three-phase voltages(Va,Vb,Vc) outputted from the inverter 20, a position sensor 30-1 outputs position detecting signals(Ha,Hb,Hc) of a rotor relative to a stator by using three Hall effect sensors installed to have a 120° spacing therebetween.

The velocity controller 51 calculates the velocity of the brushless DC motor 30 in accordance with the position detecting signals (Ha,Hb,Hc), compares the calculated value with the programmed velocity command signal, outputs the direction command signal(RS) and a voltage control signal (VC), and outputs the PWM switching signal(PSS) representing whether to control the switching device connected to the upper pole or the lower pole.

The commutating signal generator 52 converts the order and phase of the position detecting signals (Ha,Hb,Hc) in accordance with the direction command signal(RS) from the velocity controller 51 and generates the commutating signals (CS1–CS6).

Meanwhile, the sawtooth generator 53-1 in the PWM processor 53 outputs a sawtooth signal, and the comparator 53-2 compares the velocity control signal outputted from the velocity controller 51 and the sawtooth signal outputted from the sawtooth generator 53-1 and outputs a pulse-shaped PWM signal.

Next, the inverter (IN1) in the logical operator 53-3 inverts the PWM switching signal(PSS) outputted from the velocity controller 51, and the OR gate(OR1) ORs the PWM signal outputted from the comparator 53-2 and the PWM switching signal (PSS) outputted from the velocity controller 51 to output the PWM enable signal(PEN1). The OR gate(OR2) ORs the PWM signal outputted from the comparator 53-2 and the output from the inverter(IN1) to output the PWM enable signal(PEN2) Then, the three-phase buffer (BUF1) in the buffer unit 53-4 outputs the commutating signals(CS1–CS3) for controlling the power switching device connected to the upper pole of the smoothing condenser(C) in accordance with the PWM enable signal (PEN1) outputted from the logical operator 53-3 to output a pulse width modulated commutating signal. The three-phase buffer (BUF2) outputs the commutating signals(CS4–CS6) for controlling the power switching device connected to the lower pole of the smoothing condenser(C) in accordance with the PWM enable signal(PEN2) outputted from the logical operator 53-3 to output a pulse width modulated commutating signal through the gate driving unit 54 to the inverter 20.

Figures 2, 3:
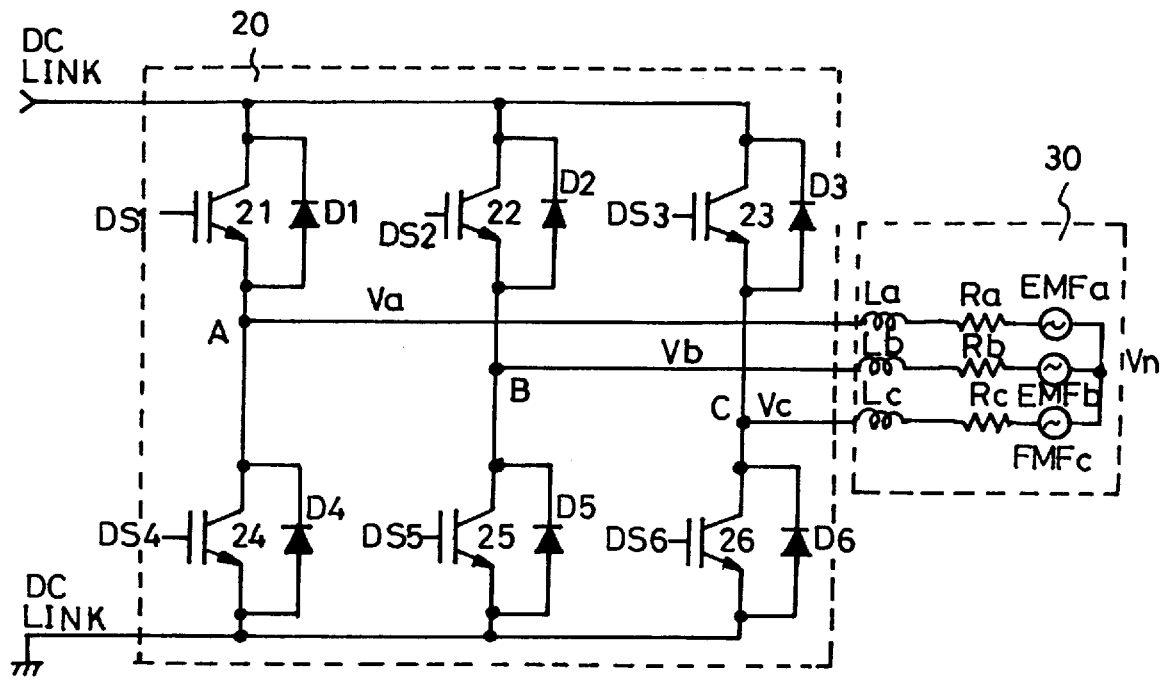
FIG. 2 is a detailed schematic circuit diagram of an inverter in FIG. 1.
Figure 3 is a table showing a driving logic of a commutating signal outputted from a commutating signal generator in FIG. 1.
Figures 4A, 4B, 4C:
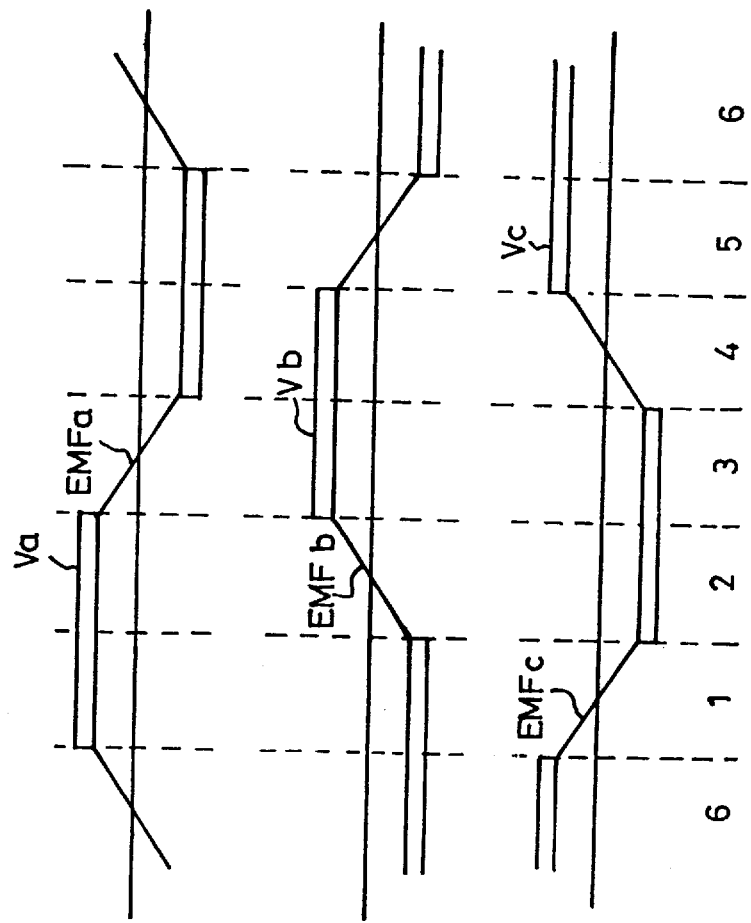
FIGS. 4A through 4C are waveform diagrams of a three-phase voltage applied to the motor in FIG. 1.

First, when the inverter 20 is operated in the sequence shown in FIG. 3, the A phase will be taken for example to explain a commutating mechanism applied to the brushless DC motor 30.

Here, FIG. 7A shows a waveform of a pulse width modulated voltage(Va) 11 and the back electromotive force 12 on the A phase.

As shown in FIG. 3, when high levels of the commutating signals(CS1,CS5) are outputted from the commutating signal generator 52 at the section one, as shown in FIG. 7C, the velocity controller 51 outputs a high level of the PWM switching signal(PSS), and the logical operator 53-3 operates logically the PWM signal from the comparator 53-2 and the high level PWM switching signal (PSS) from the velocity controller 51 to output the PWM enable signals(PEN1, PEN2).

When the high level of the PWM switching signal(PSS) is inputted, the OR gate(OR1) in the logical operator 53-3 outputs a high level PWM enable signal(PEN1) to enable the buffer(BUF1), and the OR gate(OR2) outputs the PWM signal outputted from the comparator 53-2 as the PWM enable signal(PEN2) to enable or disable the buffer(BUF2).

Therefore, in accordance with the high level of the commutating signal(CS1) outputted from the commutating signal generator 52, the upper pole of the power switching device 21 connected to the A phase through the buffer (BUF1) and the gate driving gate unit 54 is turned on, and the high level of the pulse width modulated commutating signal(CS5) in the buffer(BUF2) controls with PWM the lower pole of the power switching device 25 connected to the B phase.

Here, the current (Ia) on the A phase at the section one is increased, and the slope of the current(dIa/dt) is obtained as in the above equation (1).

Next, as in the section two, with the commutating signal (CS1) maintained at a high level, when the commutating signals(CS5,CS6) become low and high level, respectively, the velocity controller 51 outputs a low level of the PWM switching signal(PSS).

That is, in accordance with the low level of the PWM switching signal (PSS), the OR gate (OR1) of the logical operator 53-3 outputs the PWM signal outputted from the comparator 53-2 as the PWM enable signal(PEN1) to control the buffer(BUF1), and the OR gate (OR2) outputs the same as the high level of the PWM enable signal(PEN2) to enable the buffer(BUF2).

Therefore, in accordance with the high level of the commutating signal(CS6) outputted from the commutating signal generator 52, the lower pole power switching device 26 in the inverter 20 is turned on through the buffer(BUF2) and the gate driving unit 54, and the high level of the pulse width modulated commutating signal (CS1) in the buffer (BUF1) controls the upper pole power switching device 21 in the inverter 20, resulting in increasing the current(Ia) on the A phase.

Here, the slope of the current(dIa/dt) can be obtained by replacing b with c in the equation (1).

Then, at the section three, with the commutating signal (CS6) maintained at a high level, when the commutating signal(CS1,CS2) become low and high level, respectively, the velocity controller 51 outputs a high level of the PWM switching signal(PSS).

As a result, through the above procedure, the upper pole power switching device 22 connected to the B phase is turned on, and the lower pole power switching device 26 is controlled by the PWM.

Here, at the section two, the current (Ia) flowing through the upper pole power switching device 21, the inductance (La), the resistance(Ra), the intermediate electric potential node(Vn), the resistance(Rc), the inductance(Lc), and the lower pole power switching device 26 is free-wheeled through the lower pole power switching device 26 and the lower pole freewheeling diode (D4) on the A phase connected in reverse parallel with the lower pole power switching device 24.

However, since the lower pole power switching device 26 is controlled by the PWM, the current (Ia) on the A phase becomes attenuated into two forms.

That is, at the section where the lower pole switching device on the C phase is turned on by the PWM control, as in the conventional art, the current (Ia) on the A phase is freewheeled to a zero electric potential.

$$0 = 2 \times Ia \times Ra + 2 \times La \frac{dIa}{dt} + EMFab \qquad (2)$$

$$\frac{dIa}{dt} = \frac{-EMFab - 2 \times Ia \times Ra}{2 \times La}$$

At the section where the lower pole power switching device 26 on the C phase is turned off by the PWM control, the current(Ia) on the A phase flows toward the smoothing condenser(C) through the upper pole free-wheeling diode (D3) connected in reverse parallel with the upper pole power switching device 23 on the C phase.

Therefore, the voltage(vdc) between both poles of the inverter 20 has a negative value, and as a result, the current (Ia) on the A phase is free-wheeled to a DC link and sharply decreased.

That is, the current (Ia) on the A current is free-wheeled through the lower pole free-wheeling diode(D4) on the A phase and the lower pole power switching device 26 on the C phase. When the lower pole power switching device 26 on the C phase is 15 turned on by the PWM control, the current(Ia) on the A phase is free-wheeled to a zero electric potential according to the equation (2), and when the lower pole power switching device on the C phase 26 is turned off by the PWM control, the current(Ia) is free-wheeled to the DC link according to the equation (3), resulting in a sharp decrease of the current(Ia).

Figure 8:
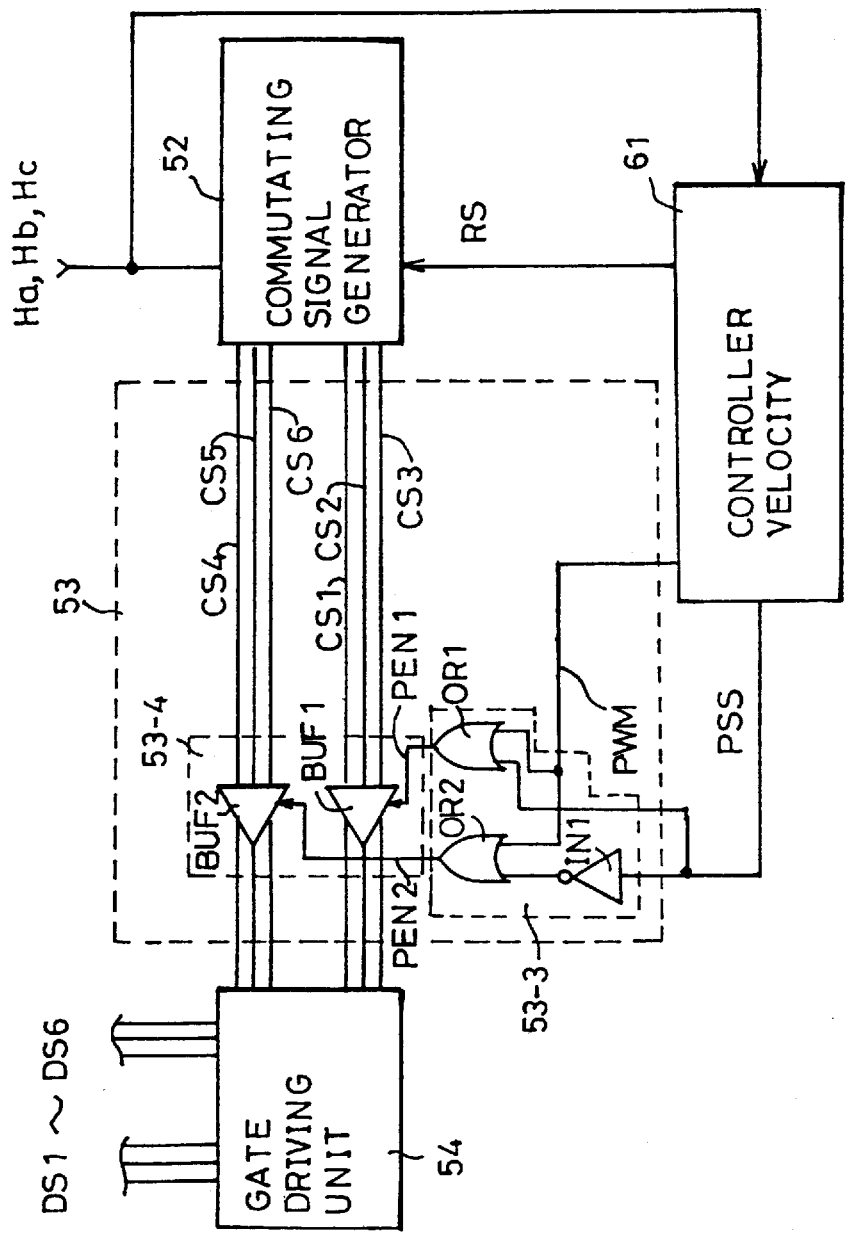
FIG. 8 is a schematic block diagram of an inverter controller for a brushless DC motor according to another embodiment of the present invention.

FIG. 8 is a block diagram of another embodiment of an inverter controller for a brushless DC motor according to the present invention. The sawtooth generator 53-1 and the comparator 53-2 shown in FIG. 6 are eliminated, and instead the PWM frequency and a duty ratio are processed by a software method in the velocity controller 61 to output the PWM signal.

As described in detail above, when the upper and lower poles of the power switching device are sequentially operated, a commutating signal is applied so that a commutated power switching device is always turned on, and the pulse width modulated commutating signal is applied to the non-commutated power switching device to bring about a sharp reduction of the current during the turned-off section of the pulse width modulated commutating signal. Thereby, when the power switching devices connected to the upper and lower poles are commutated, a constant slope of the current can be maintained.

When the power switching device connected to the upper pole at the section three is commutated, a driving efficiency of the brushless DC motor can be effectively enhanced by reducing a delay time of a free-wheeling current.

Further, a thermal balance of the power switching devices can be realized by the uniform PWM control of the power switching devices connected to the upper and lower poles to gain an effect of uniformly distributing a thermal stress applied to a specific power switching device.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An inverter controller for a brushless direct current motor, comprising:

a velocity controller for calculating a velocity of the motor from position detecting signals detected by position sensors of the motor, comparing the calculated velocity with a programmed velocity command signal to output a direction command signal and a velocity control signal, and outputting a pulse width modulation (WPM) switching signal for selectively controlling by PWM power switching devices connected to lower and upper poles of a smoothing condenser;

a commutating signal generator for converting an order and phase of the position detecting signals in accordance with the direction command signal from the velocity controller and generating a commutating signal;

a PWM processor for performing a pulse width modulation (PWM) of the commutating signal outputted from the commutating signal generator; and a gate driving unit for converting a level of the pulse width modulated commutating signal in the PWM processor and outputting a driving signal.

2. The inverter controller of claim 1, wherein the PWM processor comprises:

a sawtooth generator for generating a reference signal for the PWM;

a comparator for comparing the reference signal from the sawtooth generator with the velocity control signal from the velocity controller and outputting a PWM signal;

a logical operator for logically operating the PWM signal outputted from the comparator and PWM switching signal outputted from the velocity controller to output first and second PWM enable signals; and a buffer unit for performing a PWM on the commutating signal outputted from the commutating signal generator in accordance with the first and second PWM enable signals outputted from the logical operator.

3. The inverter controller of claim 2, wherein the logical operator comprises:

an inverter for inverting the PWM switching signal outputted from the velocity controller;

a first OR gate for ORing the PWM signal outputted from the comparator and the PWM switching signal outputted from the velocity controller to output the first PWM enable signal; and second OR gate for ORing the PWM signal outputted from the comparator and the inverted PWM switching signal from the inverter to output the second PWM enable signal.

4. The inverter controller of claim 2, wherein the buffer unit comprises:

a first three-phase buffer for outputting the pulse width modulated commutating signals to the power switching devices connected to the upper pole of the smoothing condenser in accordance with the first PWM enable signal outputted from the logical operator; and a second three-phase buffer for outputting the pulse width modulated commutating signals to the power switching devices connected to the lower pole of the smoothing condenser in accordance with the second PWM enable signal outputted from the logical operator.

5. The inverter controller of claim 4, wherein the first and second three-phase buffers apply the commutating signal to the PWM power switching device so that it is always turned on, and the pulse width modulated commutating signal to the PWM power switching device so that it is pulse width modulated.

6. The inverter controller of claim 1, wherein the velocity controller calculates the velocity of the motor from the position detecting signals detected by the position sensors, compares the calculated velocity with the programmed velocity command signal to output the direction command signal and the PWM switching signal, and the output PWM switching signal for selectively PWM-controlling the power switching devices connected to the upper or lower pole of the smoothing condenser.

\* \* \* \* \*